United States Patent [19]
Ohkawa

[11] Patent Number: 5,997,148
[45] Date of Patent: Dec. 7, 1999

[54] SURFACE LIGHT SOURCE DEVICE OF SIDE LIGHT TYPE

[75] Inventor: Shingo Ohkawa, Koshigaya, Japan

[73] Assignees: Enplas Corporation, Kawaguchi; Yasuhiro Koike, Yokohama, both of Japan

[21] Appl. No.: 09/081,605

[22] Filed: May 20, 1998

[30] Foreign Application Priority Data

Jun. 4, 1997 [JP] Japan .................................. 9-161953

[51] Int. Cl.⁶ .................................................. F21V 7/04
[52] U.S. Cl. ........................ 362/31; 385/901; 40/546
[58] Field of Search ........................... 362/26, 27, 31; 385/901; 349/65; 40/546

[56] References Cited

U.S. PATENT DOCUMENTS

| | | | |
|---|---|---|---|
| 5,005,108 | 4/1991 | Pristash | 362/31 |
| 5,283,563 | 2/1994 | Allen et al. | 345/102 |
| 5,572,411 | 11/1996 | Watai et al. | 362/31 |
| 5,596,429 | 1/1997 | Kokawa et al. | 349/67 |
| 5,659,410 | 8/1997 | Koike et al. | 362/31 |
| 5,709,447 | 1/1998 | Murakami et al. | 362/31 |
| 5,719,649 | 2/1998 | Shono et al. | 362/31 |
| 5,779,338 | 7/1998 | Ishikawa et al. | 362/31 |
| 5,806,955 | 9/1998 | Parkyn, Jr. et al. | 362/31 |
| 5,808,784 | 9/1998 | Ando et al. | 359/443 |
| 5,854,872 | 12/1998 | Tai | 385/901 |
| 5,926,033 | 7/1999 | Saigo et al. | 362/27 |
| 5,926,601 | 7/1999 | Tai et al. | 385/901 |

FOREIGN PATENT DOCUMENTS

| | | | |
|---|---|---|---|
| 1145934 | 10/1957 | France | 362/31 |
| 0123408 | 6/1987 | Japan | 385/901 |

*Primary Examiner*—Cassandra Spyrou
*Assistant Examiner*—John Juba, Jr.
*Attorney, Agent, or Firm*—Staas & Halsey

[57] ABSTRACT

A surface light source device of side light type includes a primary light source, a reflection sheet, a light scattering guide plate, and a prism sheet. The primary light source comprises a fluorescent lamp and a reflector to supply illumination light toward an incidence surface of the light scattering guide plate. The light scattering guide plate has an emission surface and a back surface, with the prism sheet being disposed along the emission surface. On the emission surface and/or the back surface, a great number of grooves running generally perpendicular to the incidence surface within a range of distance W1 and/or W2 from an upper edge EU and/or a lower edge EL. These grooves provide a corrugate shape in a cross section parallel to the incidence surface. Depth of corrugate shape gradually becomes shallower as getting away from the incidence surface. Illumination light illuminating the edges EU and EL is prevented from being excessively emitted from a specific linear region of the emission surface, with the result that bright line (reflective appearance) is prevented. Such grooves may be formed in the vicinity of the edge where the side surface and the major surfaces intersect. A light control surface may be formed on the full surface of the emission surface or the back surface.

5 Claims, 7 Drawing Sheets

( Prior Art )

(Prior Art)

SURFACE LIGHT SOURCE DEVICE OF SIDE LIGHT TYPE

BACKGROUND

1. Field of Invention

The present invention relates to a surface light source device of side light type. The present invention is applied to, e.g., back lighting of liquid crystal display.

2. Related Art

The surface light source device of side light type is conventionally applied to a liquid crystal display, for example, and illuminates a liquid crystal panel from its back. This arrangement is suitable for reducing thickness of the entire shape of the device.

A rod-shape light source such as a cold cathode tube is usually employed as a primary light source for the surface light source device of side light type, and is disposed on a side of a guide plate (plate-shaped guide element). Illumination light emitted from the primary light source is passed through a side end surface of the guide plate to be introduced into the guide plate. The introduced illumination light is propagated in the guide plate and during this process, light emission occurs from a major surface of the guide plate toward the liquid crystal panel.

As the guide plate employed for such a surface light source device of side light type, there are known guide plates of a type having a generally uniform plate thickness, and of a type having a plate thickness which is reduced as getting away from the primary light source. In general, the latter type emits illumination light more effectively than the former type.

Figure 9:
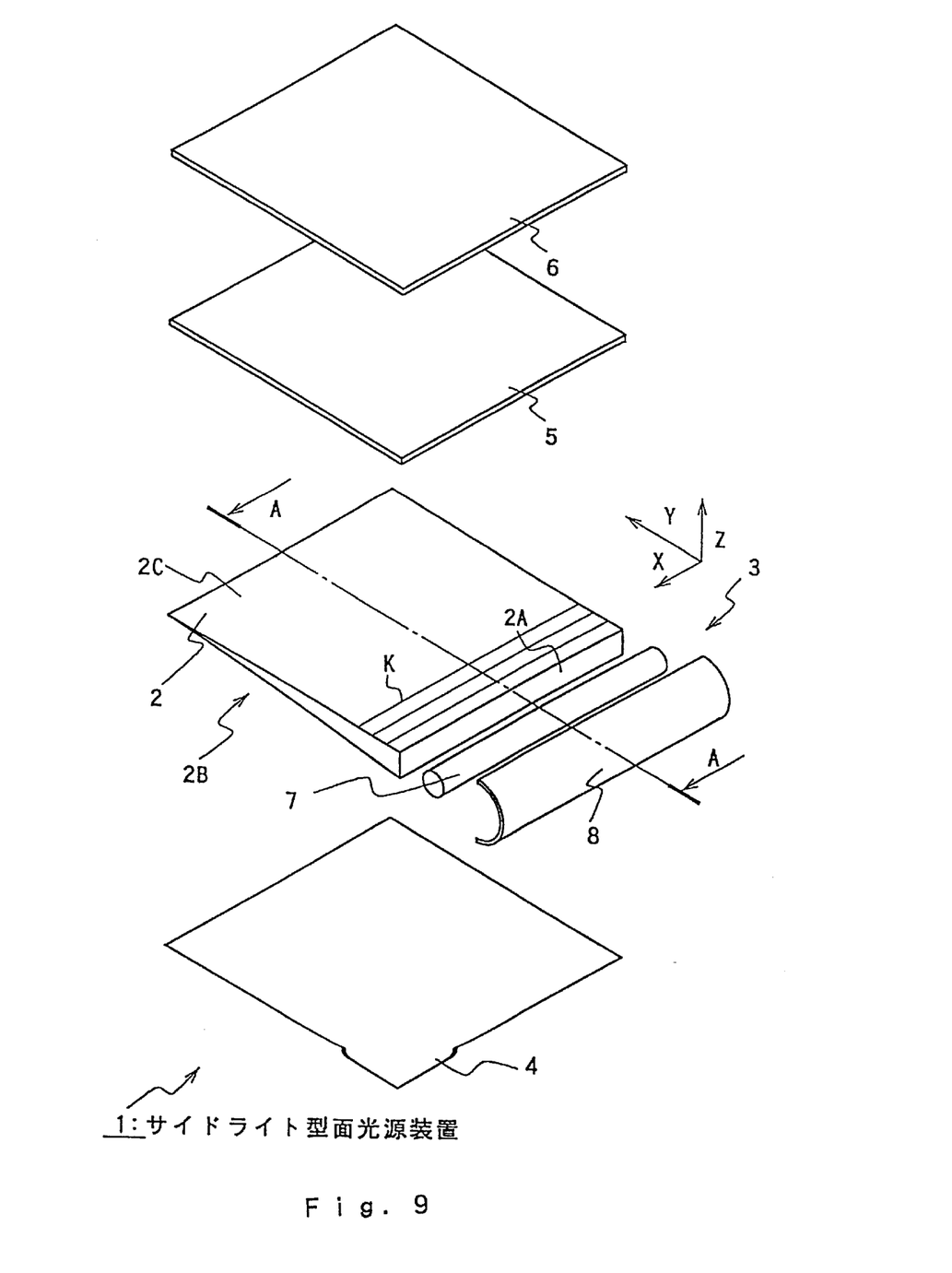
FIG. 9 is an exploded perspective view showing a conventional surface light source device of side light type.
Figure 10:
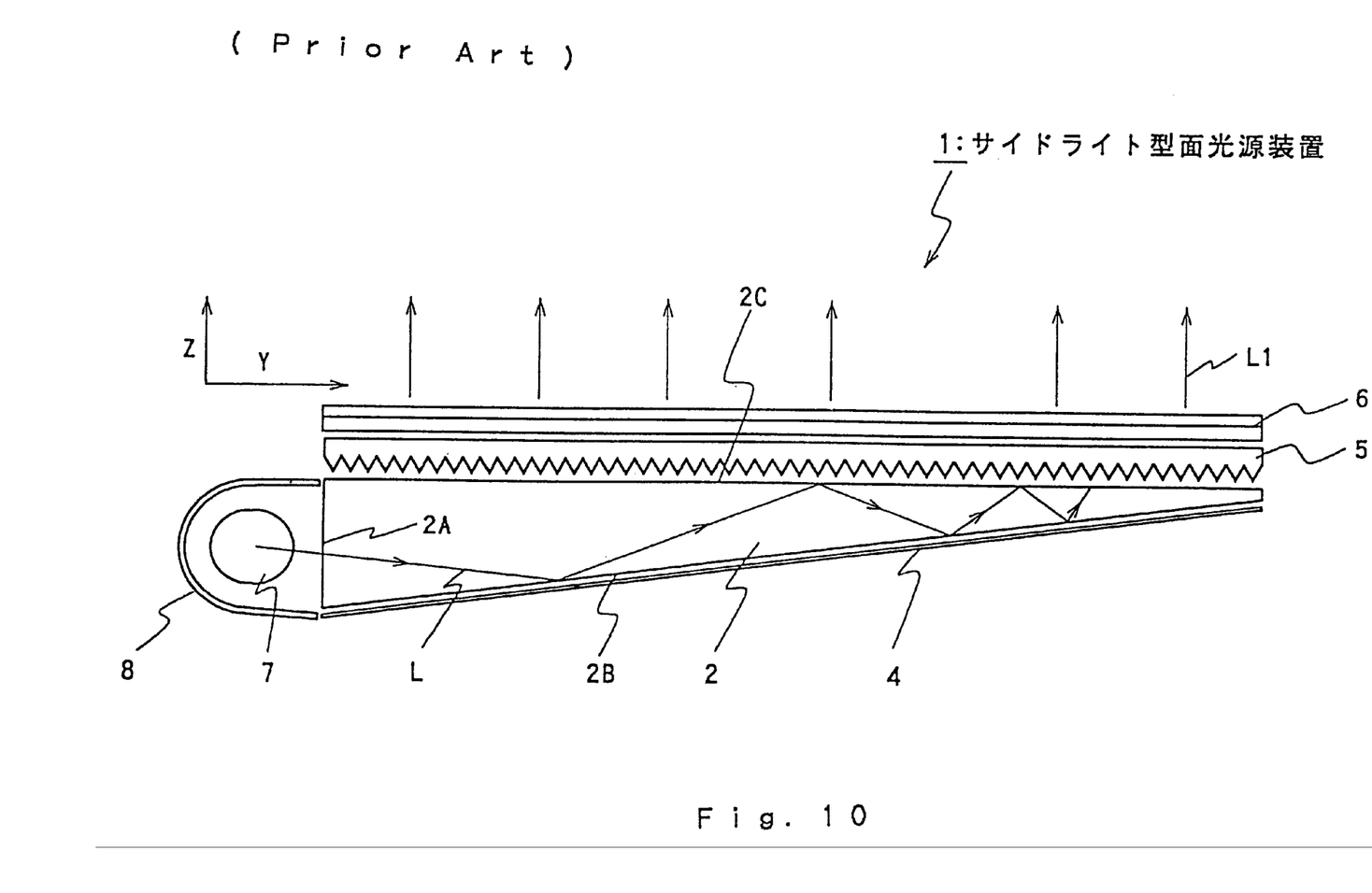
FIG. 10 is a sectional view taken along the line A—A in FIG. 9.

FIG. 9 is an exploded perspective view showing a surface light source device of side light type, and FIG. 10 is a sectional view taken along line A—A in FIG. 9. Referring to FIGS. 9 and 10, a surface light source device of side light type 1 includes a guide plate 2, a primary light source 3 disposed on a side thereof, a reflection sheet 4, prism sheets 5 and 6 as light control members. The reflection sheet 4, the guide plate 2 and the prism sheets 5 and 6 are laminatedly arranged.

The guide plate 2 is a plate-shaped light guide member having a wedge-shaped cross section. In this example, a scattering guide material is employed as a material of the guide plate 2. The light scattering guide material comprises a matrix made of PMMA (polymethyl methacrylate) and a great number of transmissive particles uniformly dispersed in the matrix. Index of refraction of the particles is different from that of the matrix. Such a guide plate is called a light scattering guide plate.

The guide plate (light scattering guide plate) 2 includes major surfaces providing an emission surface 2C and a back surface 2B. Instead of the light scattering guide plate 2, a guide plate made of a transparent acrylic resin, for example, may be employed. If the transparent guide plate is employed, a light scattering surface is usually formed on its back surface 2B.

The primary light source 3 includes a cold cathode tube (fluorescent lamp) 7, and a reflector 8 disposed behind a back surface of the cold cathode tube 7 and having a semicircular cross section. Illumination light is supplied toward a side end surface of the guide plate 2 through an opening of the reflector 8. The reflection sheet 4 may be a sheet-shaped regular reflection member made of metal foil or the like, or a sheet-shaped light scattering member made of white PET film or the like.

Illumination light L from the primary light source 3 is introduced into the guide plate 2 through an incidence surface 2A provided by a side end surface of the guide plate 2. Illumination light L is propagated toward a distal end while illumination light L is repeatedly reflected between the emission surface 2C and the back surface 2B along which the reflection sheet 4 is disposed. During that time, illumination light L is subject to scattering effect by the particles in the light scattering guide plate 2. If the reflection sheet 4 made of a scattering member is employed, illumination light L is also subject to light diffusing effect.

As illumination light L is reflected by the slope 2B, incident angle with respect to the emission surface 2C is reduced. Reduction in the incident angle increases component which becomes equal to or lower than critical angle with respect to the emission angle, which promotes emission from the emission surface. With this characteristic, a shortage in emission light in a region far away from the primary light source 3 is avoided.

Illumination light emitted from the emission surface 2C has a light scattering nature because illumination light has experienced scattering due to the transmissive particle, or a light diffusion due to the reflection sheet 4. However, a preferential propagation direction (main propagation direction) of illumination light emitted from the light scattering guide plate 2 is inclined toward the distal end (opposite direction from the primary light source 3) with respect to the frontal direction. The light emitted from the light scattering guide plate 2 has such directivity. This nature of the light scattering guide plate 2 is called as emission directivity.

The prism sheets 5 and 6 are arranged so as to correct the emission directivity of the light scattering guide plate 2. The prism sheets 5 and 6 are formed of transparent sheet material such as polycarbonate. The prism sheet 5 is arranged so that its prism surface is opposed to the light scattering guide plate 2. The prism sheet 6 is arranged so that its prism surface turns its back to the light scattering guide plate 2.

Each of the prism surfaces includes a great number of protrusions each having a triangular cross section extended generally in parallel in one direction. The inner prism sheet 5 is oriented so that the protrusions run in parallel to the incidence surface 2A. The outer prism sheet 6 is oriented so that the protrusions run generally perpendicular to the incidence surface 2A. Slopes of these protrusions correct the main emitting direction of emitting light into a frontal direction of the emission surface 2C. A so-called both sides prism sheet in which prism sheets are formed on both sides may be used.

In general, the surface light source device of side light type employing such a wedge-shaped guide plate and the prism sheets emits the emitting light in the frontal direction more effectively than a surface light source device of side light type employing a guide plate having generally uniformed thickness.

However, in the above-described conventional device, one or some bright lines which are unfavorable for the emission surface 2C are generated as shown with symbol K in FIG. 9. The bright lines form locally thin and high luminance band, and lower the uniformity of output light. A cause of generation of bright line is that upper and lower edges of the incident surface is illuminated strongly. The illuminated edges appear as locally high luminance band on the emission surface 2C through reflection in the light scattering guide plate 2. Such a phenomenon is called as "reflective appearance" or "reflective appearance of edge".

Removing of such a phenomenon is an important matter to improve quality of output light in the surface light source device of side light type. A weak reflective appearance similar to the reflective appearance could be generated by illuminating the upper and lower edges of left and right side surfaces adjacent to the incidence surface.

OBJECT AND SUMMARY OF INVENTION

An object of the present invention is to prevent the above-described reflective appearance of edges, thereby improving quality of output light of surface light source devices of side light type.

The present invention is applied to a surface light source device of side light type, comprising a guide plate having an emission surface and a back surface as major surfaces, and a primary light source for supplying illumination light from an end surface of the guide plate, in which the emission surface intersects the end surface to provide a first edge, the back surface intersects the end surface to provide a second edge. According to a feature of the present invention, the guide plate includes a great number of grooves running generally perpendicular to the end surface from the first edge and/or the second edge, the great number of grooves have a corrugate shape within a cross section thereof parallel to the end surface, and depth of corrugate shape is reduced as getting away from the end surface.

A side surface adjacent to the end surface intersects the emission surface and the back surface to provide third and fourth edges. A great number of further grooves may be formed from one or both of the third and fourth edges running generally perpendicular to the side surface. These grooves have a corrugate shape within a cross section thereof parallel to the side surface, and depth of corrugate shape is reduced as getting away from the side surface.

Further, a light control surface for correcting directivity of emission light from the emission surface may be formed over the entire surface of one of the emission surface and the back surface. The light control surface includes a great number of projections running such as to cross generally at right angles with the end surface. Further, a light control element for correcting directivity of emission light from the guide plate along the emission surface may be disposed.

These grooves formed in various manners in the vicinity of each of the edges of the guide plate diversifies propagation directions in the guide plate, thereby preventing a phenomenon in which illumination light having illuminated the edges is excessively emitted from a specific linear region in the emission surface. As a result, bright line (reflective appearance) is prevented, and uniformity of output light of the surface light source device is improved. The present invention will be explained in more detail below with reference to the accompanying drawings.

EMBODIMENTS

(1) First Embodiment

Figure 1:
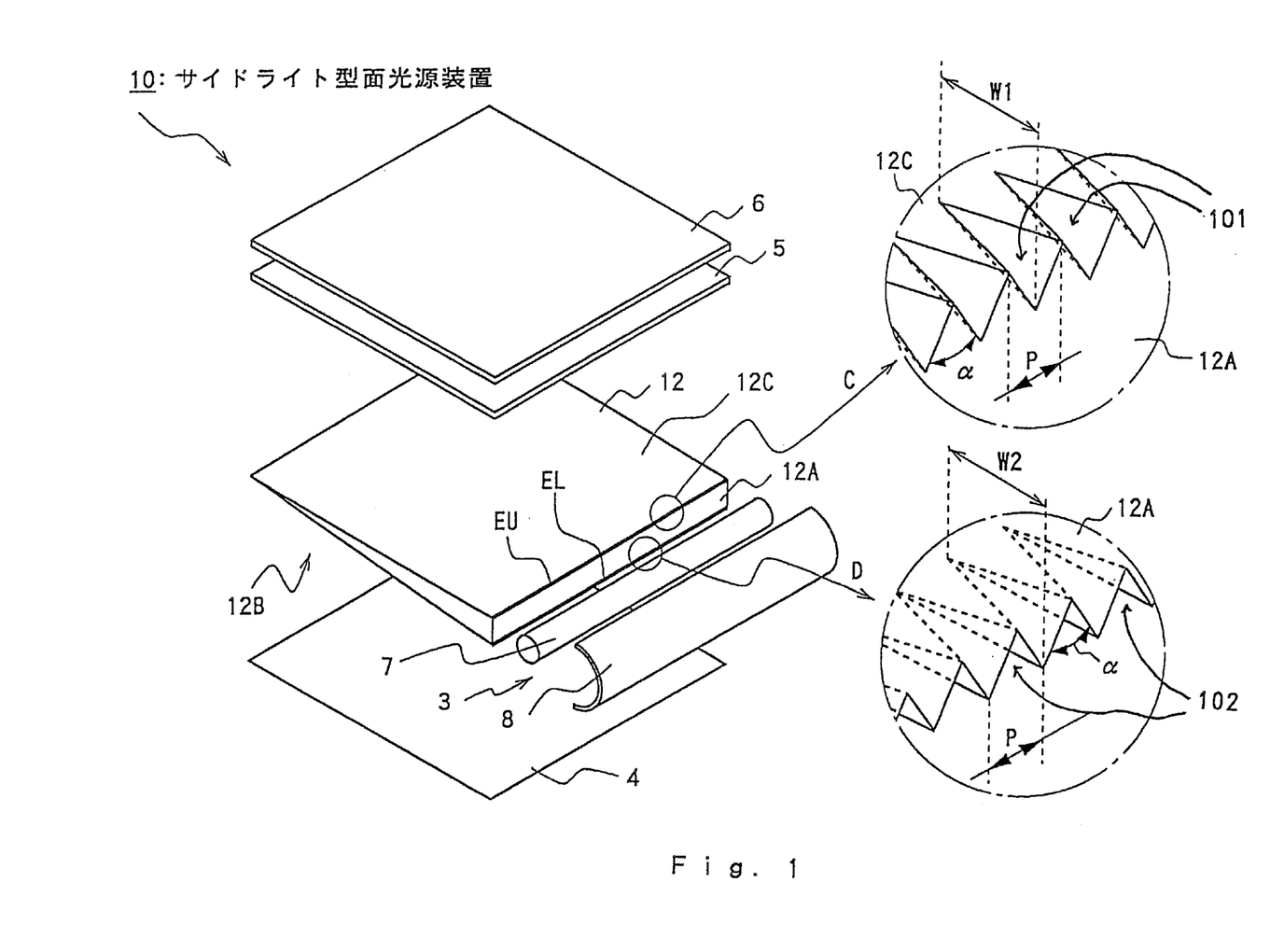
FIG. 1 is an exploded perspective view showing a surface light source device according to a first embodiment of the present invention.
Figure 2:
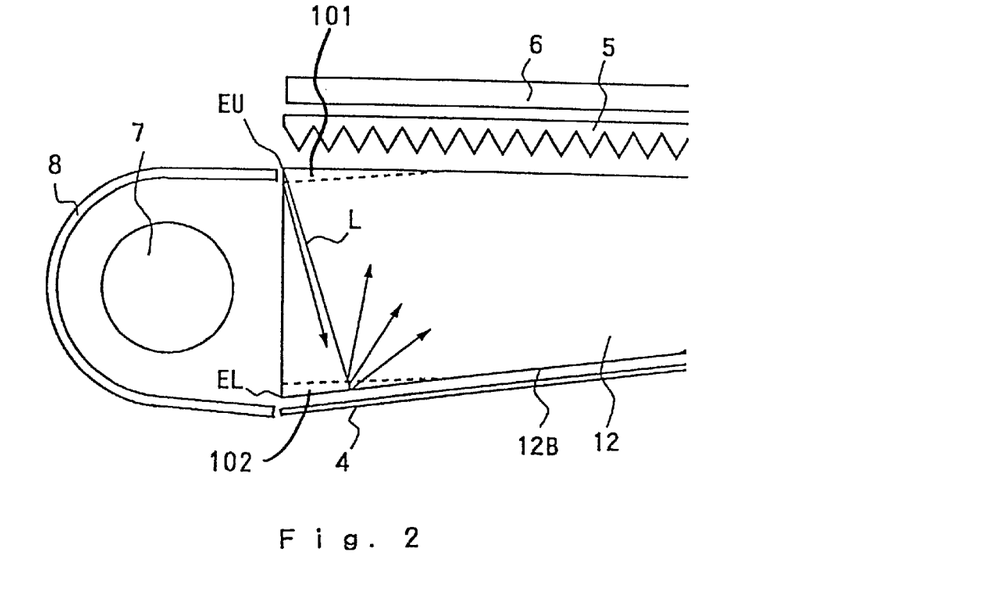
FIG. 2 is a view for explaining behavior of illumination light associated with an upper edge of the surface light source device shown in FIG. 1.
Figure 3:
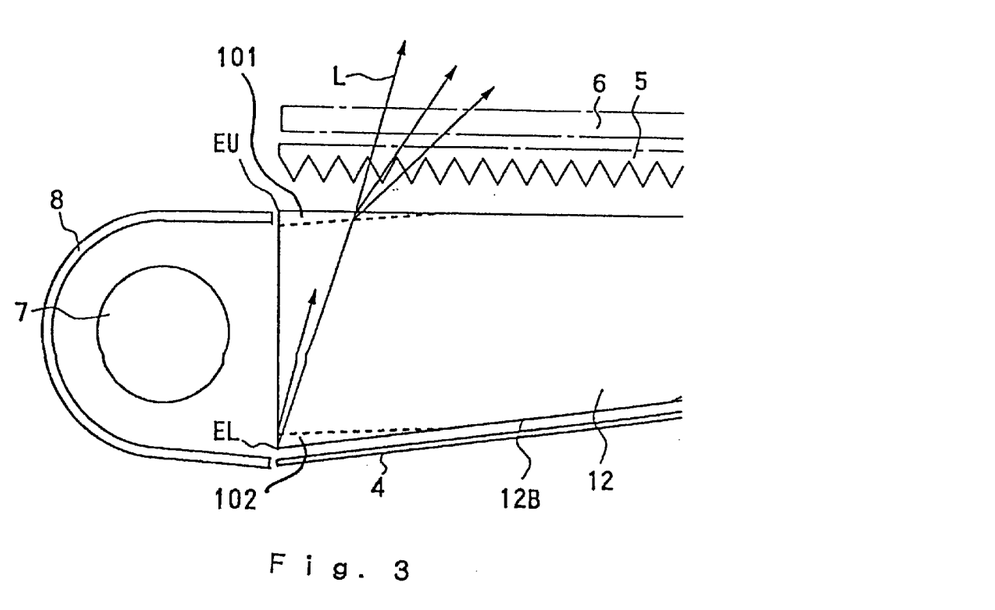
FIG. 3 is a view for explaining behavior of illumination light associated with a lower edge of the surface light source device shown in FIG. 1.

Referring to FIGS. 1 to 3, a first embodiment will be explained. The present invention is common to the conventional structure shown in FIGS. 8 and 9 except that a great number of grooves are employed for preventing the reflective appearance. Therefore, the common elements are denoted by common symbols, and the repetitive explanation is simplified.

Referring first to FIG. 1, a surface light source device 10 of side light type includes a primary light source 3, a reflection sheet 4, a light scattering guide plate 12 and prism sheets 5 and 6. The primary light source 3 comprises a fluorescent lamp 7 and a reflector 8, and supplies illumination light toward an incidence surface 12A of the light scattering guide plate 12. The light scattering guide plate 12 includes an emission surface 12C and a back surface 12B as two major surfaces, and the prism sheets 5 and 6 are arranged along the emission surface 12C.

The reflection sheet 4, the light scattering guide plate 12 and the prism sheets 5 and 6 are laminatedly arranged, and are held together with the fluorescent lamp 7 and the reflector 8 by a frame member which is not shown. The light scattering guide plate 12 has a wedge-shaped cross section, a relatively thick end thereof provides the incidence surface 12A along the fluorescent lamp 7.

The light scattering guide plate 12 comprises a light scattering guide element. The light scattering guide element comprises a matrix made of PMMA (polymethyl methacrylate) and a great number of transparent particulate uniformly dispersed in the matrix. Index of refraction of the particulate is different from that of the matrix.

The reflection sheet 4 is a regular reflection member with silver deposited on a base so that the reflection sheet 4 exhibits a high reflectance with respect to illumination light. The reflection sheet 4 effectively returns illumination light leaked from the back surface 12B of the light scattering guide plate 12 into the light scattering guide plate 12 so as to prevent loss of illumination light.

Illumination light introduced from the incidence surface 12A of the light scattering guide plate 12 is repeatedly reflected between the back surface 12B and the emission surface 12C to be propagated while being scattered by particle. During this process, illumination light is emitted from the emission surface 12C at a generally constant rate.

For the above-described reason, the emission light from the emission surface 12C has directivity, and its preferential propagation direction is inclined toward a distal end direction (the opposite direction from the primary light source 3) with respect to the frontal direction.

The prism sheet 5 is arranged so that its prism surface is opposed to the light scattering guide plate 2. The prism sheet 6 is arranged so that its prism surface turns its back to the light scattering guide plate 2. The prism sheet 5 is oriented so that the protrusions run in parallel to the incidence surface 12A. The outer prism sheet 6 is oriented so that the protrusions run generally perpendicular to the incidence surface 12A. Slopes of these protrusions correct the preferential emitting direction of emitting light into a frontal direction of the emission surface 12C.

A typical type of the prism sheet 5 is formed by curing an acryl-based ultraviolet curing resin or the like on a base comprising, e.g., a transparent PET such as to form recesses and protrusions, and is fixed.

According to a feature of the present embodiment, a groove structure is employed for preventing the reflective appearance for an upper edge EU and a lower edge EL. The upper edge EU is a liner region in which the emission surface 12C intersects the incidence surface 12A, and the lower edge EL is a liner region in which the back surface 12B intersects the incidence surface 12A.

As partially enlarged in FIG. 1 by the arrow C, the emission surface 12C is formed with a great number of grooves 101 running from the upper edge EU generally in a vertical direction to the incidence surface 12A. Similarly, in the back surface 12B, as partially enlarged in FIG. 1 by the arrow D, the lower edge EL is formed with a great number of grooves 102 running from the lower edge EL generally in a vertical direction to the incidence surface 12A. These grooves have corrugate shape within a cross section parallel to the incidence surface 12A.

Running regions of groove groups 101 and 102 are in ranges of distance W1 from the upper edge EU and distance W2 from the lower edge EL, respectively. Within these regions, depth of each of the grooves (depth of corrugate shape) becomes shallower as getting away from the incidence surface 12A. According to one example of corrugate shape, a triangular element having a vertex $\alpha$ of about 100° is repeated by a repeating pitch P of 0.05 mm, and W1=W2= 10 mm. Within this range (W1=W2=10 mm), the triangular elements are gradually reduced in size as getting away from the incidence surface 12A, and depth of corrugate shape becomes shallower.

These groove groups 101 and 102 prevent a bright line shaped unevenness of luminance (see a bright line K in FIG. 1) which might be generated by illuminating the upper and lower edges EU and EL. As shown in FIG. 2, much of illumination light entering in the vicinity of the upper edge EU is reflected on an inner surface of the groove group 101 having the corrugate cross section, and enters the groove group 102 formed in the vicinity of the lower edge EL from inside. Here, illumination light is reflected in many directions due to the corrugate cross section. As a result, a phenomenon is which illumination light passed through the vicinity of the upper edge EU goes toward a specific linear region of the emission surface 12C is avoided.

Similarly, as shown in FIG. 3, much of illumination light entering in the vicinity of the lower edge EL without passing through the vicinity of the upper edge EU are reflected in many directions on an inner surface of the groove group 102 having the corrugate cross section, and most of such light enters the groove group 101 formed in the vicinity of the upper edge EU, and is propagated in many directions. Such a process avoids excessive emission from a specific linear region of the emission surface 12C.

If no groove groups are not formed, and the edges EU and EL are straight, illumination light is strongly introduced into one or a plurality of specific linear regions, and emission light therefrom is excessively increased so that the bright line K (see FIG. 9) is formed. After all, the present embodiment suppresses the appearance of bright line (the reflective appearance), and provides output light having high uniformity as compared with a conventional structure.

Here, attention must be paid to a point that the groove groups 101 and 102 formed to prevent the reflective appearance have a possibility to influence the directivity characteristic of emission light from the emission surface 12C. If such an influence is serious, the uniformity of output light may be lowered. However, the influence can be suppressed to a level in which the influence may practically be left out of consideration by limiting regions in which the groove groups 101 and 102 are formed to vicinities of the edges EU ad EL (ranges of distances W1 and W2). The above described values of W1 and W2 (W1=W2=10 mm) provide such a practical merit.

(2) Second Embodiment

Figure 4:
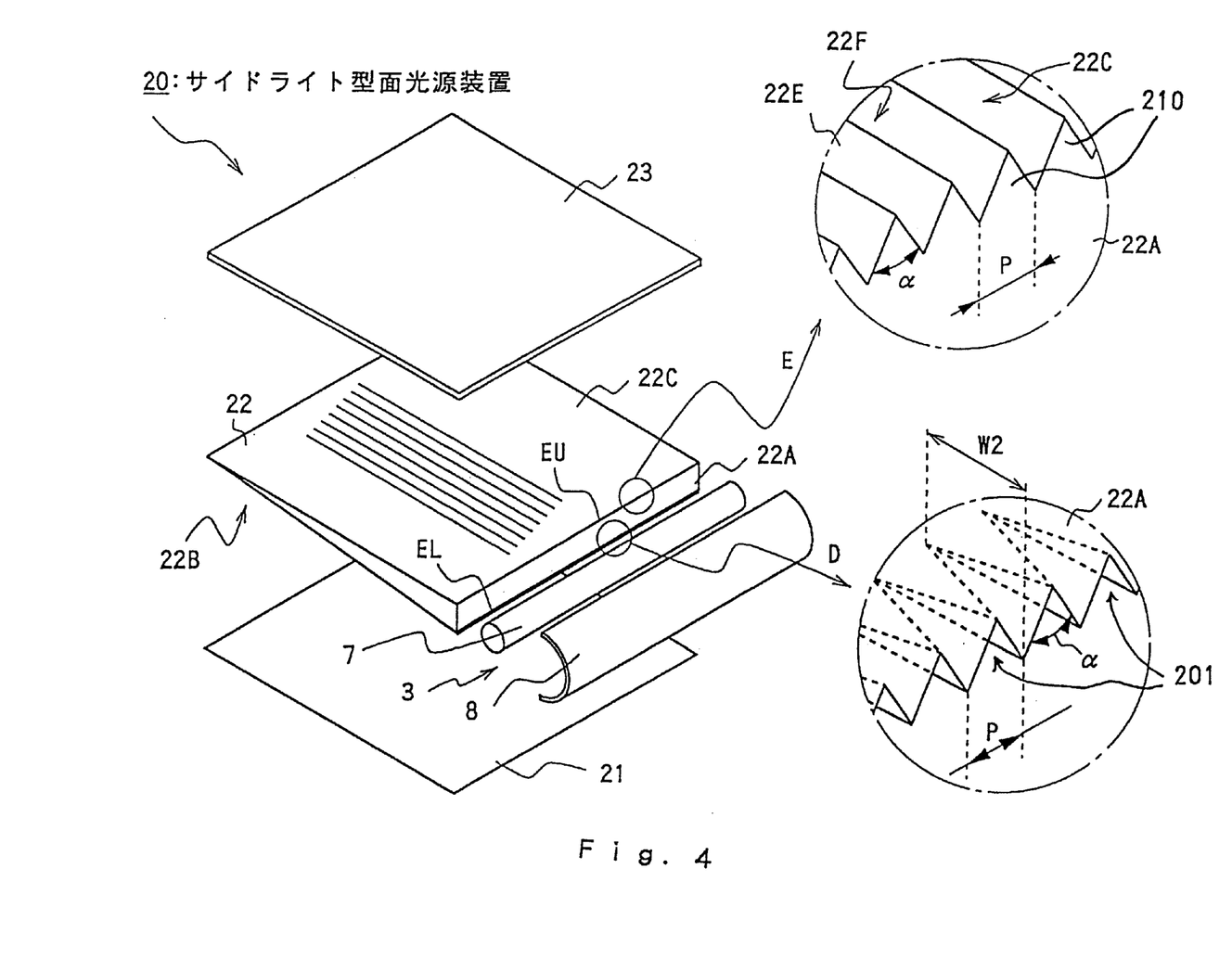
FIG. 4 is an exploded perspective view showing a surface light source device according to a second embodiment of the invention.
Figure 5:
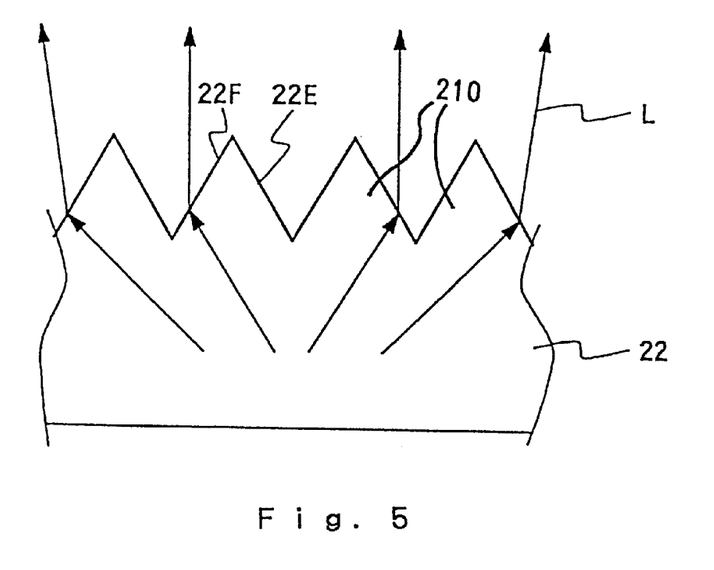
FIG. 5 is illustrating emission light from a light scattering guide plate of the surface light source device shown in FIG. 4.
Figure 6:
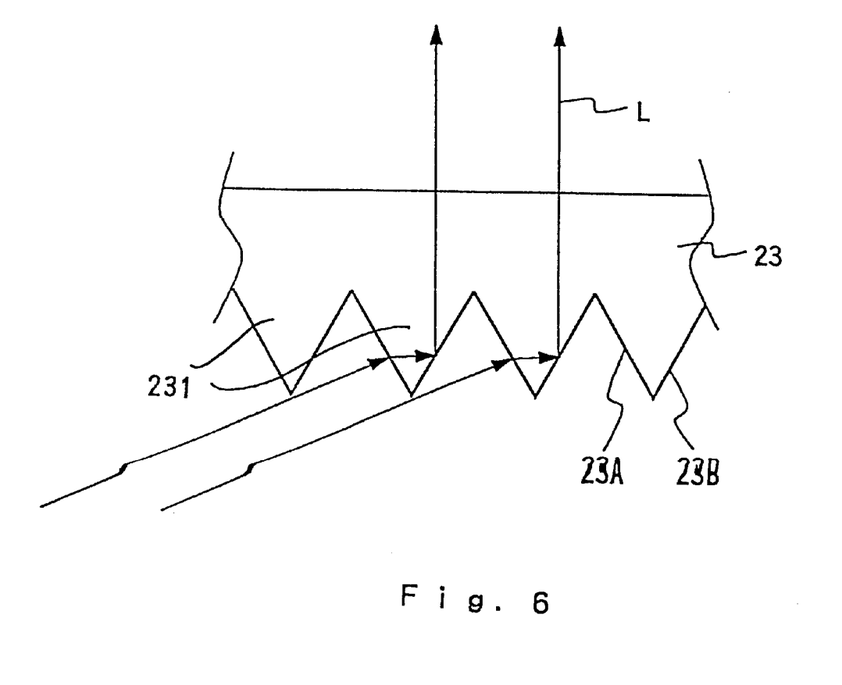
FIG. 6 is illustrating directivity correcting function of a prism sheet employed in the surface light source device shown in FIG. 4.

Referring to FIGS. 4 to 6, a second embodiment will be explained. The second embodiment is common to the first embodiment except locations in which the groove groups for preventing the reflective appearance are formed and correcting means of preferential propagation direction. Therefore, the common elements are denoted by common symbols, and the repetitive explanation is simplified.

Referring first to FIG. 4, a surface light source device 20 of side light type includes a primary light source 3, a reflection sheet 21, a light scattering guide plate 22 and a prism sheet 23. The primary light source 3 comprises a fluorescent lamp 7 and a reflector 8, and supplies illumination light toward an incidence surface 22A of the light scattering guide plate 22. The light scattering guide plate 22 includes an emission surface 22C and a back surface 22B as two major surfaces, and the prism sheet 23 are arranged along the emission surface 22C.

The reflection sheet 21, the light scattering guide plate 22 and the prism sheet 23 are laminatedly arranged, and are held together with the fluorescent lamp 7 and the reflector 8 by a frame member which is not shown. The light scattering guide plate 22 has a wedge-shaped cross section, a relatively thick end thereof provides the incidence surface 22A along the fluorescent lamp 7.

The reflection sheet 21 is a regular reflection member with silver deposited on a base so that the reflection sheet 21 exhibits a high reflectance with respect to illumination light. The reflection sheet 21 effectively returns illumination light leaked from the back surface 22B of the light scattering guide plate 22 into the light scattering guide plate 22 so as to prevent loss of illumination light.

The light scattering guide plate 22 comprises a light scattering element. The light scattering guide element comprises a matrix made of PMMA (polymethyl methacrylate) and a great number of transparent particulate uniformly dispersed in the matrix. Index of refraction of the particulate is different from that of the matrix.

Illumination light introduced from the incidence surface 22A of the light scattering guide plate 22 is repeatedly reflected between the back surface 22B and the emission surface 22C to be propagated while being scattered by particle. During this process, illumination light is emitted from the emission surface 22C at a generally constant rate. For the above-described reason, the emission light from the emission surface 22C has directivity, and its preferential propagation direction is inclined toward a distal end direction (the opposite direction from the primary light source 3) with respect to the frontal direction.

According to a feature of the present embodiment, a groove structure for preventing the reflective appearance is employed in the vicinity of the lower edge EL, and a light control surface is formed on the emission surface 22C. That is, as partially enlarged in FIG. 4 by the arrow C, a great number of projections 210 running generally in a vertical direction with respect to the incidence surface 22A are formed over the entire surface of the emission surface 22C. On the other hand, as partially enlarged in FIG. 4 by the arrow D, a great number of grooves 201 running generally in a vertical direction with respect to the incidence surface 22A from the lower edge EL are formed on the back surface 22B. The grooves 201 have a corrugate shape within a cross section parallel to the incidence surface 22A.

A running region of the groove groups 201 is in a range of distance W2 from the lower edge EL as shown in FIG. 4. Within this region, depth of each of the grooves (depth of corrugate shape) becomes shallower as getting away from the incidence surface 22A. According to one example of corrugate shape, a triangular element having a vertex α of about 100° is repeated by a repeating pitch P of 0.05 mm, and W2=10 mm. Within this range (W2=10 mm), the triangular elements are gradually reduced in size as getting away from the incidence surface 22A, and depth of corrugate shape becomes shallower. A great number of fine projections 210 forming a light control surface on the emission surface 22C run parallel to the incidence surface 22A from the upper edge EU to the distal end. Each of the projections 210 includes a pair of slopes 22E and 22F. In the present embodiment, the pair of slopes 22E and 22F are directly connected to form a triangular cross section.

FIG. 5 shows a cross section of the light scattering guide plate 22 parallel to the incidence surface 22A and light passages with arrows. As can be seen from the light passages, the slopes 22E and 22F of the projections 210 are refracted to correct the preferential propagation direction of the emission light to the frontal direction within a surface parallel to the incidence surface 22A.

Further, these projections 210 exhibit the same function as that of the first embodiment in the vicinity of the upper edge. This is because that the cross section of these projection group parallel to the incidence surface 2A around the vicinity of the upper edge EU has a corrugate shape, and illumination light which enters there is reflected in many directions.

On the other hand, the function of the groove group 201 formed in the vicinity of the lower edge EL is the same as the first embodiment. Corrugate cross section structures similar to the first embodiment are formed in the vicinities of both the upper and lower edges EU and EL. As a result, a bright line (reflective appearance) due to the illumination of the upper and lower edges is prevented from being generated for the same reason as explained with reference to FIGS. 2 and 3.

In the present embodiment, the pair of slopes 22E and 22F have the same inclination angle with respect to a general surface on which the emission surface 22C is placed. A vertex α defined between the slopes 22E and 22F is, for example, about 100°. In general, the vertex α is preferably in a range of 50° to 130°, and more preferably, in a range of 60° to 110°.

Repeating pitch of the fine projections is preferably 100 μm or less, and more preferably, 50 μm or less. This value corresponds to ½ (100 μm or less) or ¼ (50 μm or less) of pixel cycle of a liquid crystal display panel which is back lightened by the surface light source device 20, and prevents moire band and fine cyclic luminance unevenness from being generated.

The prism sheet 23 is formed at its one surface with a prism surface. The prism surface includes a great number of fine projections running in parallel to one another. The orientation of the fine projections is selected so that the prism surface toward the emission surface 22C and that the great number of projections run generally parallel to the incidence surface 22A. FIG. 6 shows a cross section of the prism sheet 23 (perpendicular to the incidence surface 22A) and light passages with arrows. As can be seen from the light passages, the slopes 23A and 23B of the projection 231 forming the prism surface correct the preferential propagation direction of the emission light to the frontal direction within a surface perpendicular the incidence surface 22A.

The light control surface (prism surface) of the prism sheet 23 provides a combination of light control means in cooperation with the light control surface on the above-described emission surface 22C. That is, the light control surface on the emission surface 22C corrects the preferential propagation direction to the frontal direction within a plane which is in parallel to the incidence surface 22A, and the prism sheet 23 corrects the preferential propagation direction to the frontal direction within the plane perpendicular to the incidence surface 22A.

As described above, even if the entire surface of the emission surface 22C is formed into corrugate shape according the present embodiment, the reflective appearance can be prevented as in the first embodiment. Further, since number of prism sheet to be employed is decreased, improvement of the output efficiency of illumination light can be expected. Needless to say, repeating pitch of the fine projections of the prism sheet 23 is preferably 100 μm or less, and more preferably, 50 μm or less.

Third Embodiment

Figure 7:
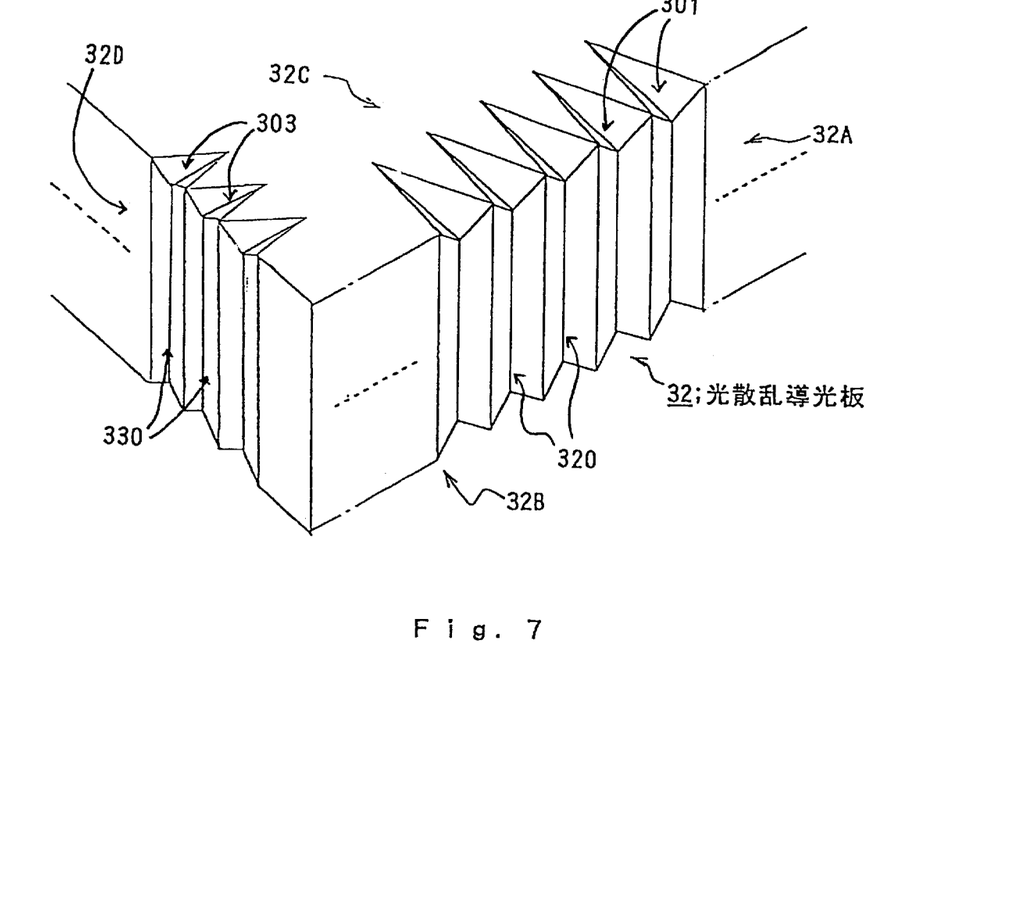
FIG. 7 is a partially enlarged perspective view for explaining structure of a light scattering guide plate employed in a surface light source device according to a third embodiment of the invention.

Referring to FIG. 7, a third embodiment will be explained. The entire structure of the present embodiment is common to the first embodiment except that a location in the guide plate where groove groups are formed. Therefore, the feature of the present embodiment will be mainly explained, and the repetitive explanation about the entire structure will be simplified.

FIG. 7 is an enlarged perspective view of portions of an incidence surface and a side surface of a light scattering guide plate 32 characterizing the present embodiment. The entire structure of the present embodiment is obtained by replacing the light scattering guide plate 12 of the first embodiment by the light scattering guide plate 32. According to the feature of the guide plate 32, a great number of grooves are formed in the following manner:

(i) In the vicinity of an upper edge in which an emission surface 32C and an incidence surface 32A intersect, a great number of grooves 301 are formed over the generally entire width of the light scattering guide plate 32. The groove group 301 has a structure which is common to the groove group 101 in the first embodiment. That is, the groove group 301 has a corrugate shape within a cross section parallel to a general running direction of the incidence surface 32A, and depth of each of the grooves (depth of corrugate shape) becomes shallower as getting away from the incidence surface 32A.

A range in which the groove group 301 is formed is limited to the same range as that of the first embodiment (e.g., the range of W1).

(ii) Similarly, in the vicinity of the lower edge in which the back surface 32B and the incidence surface 32A intersect, a great number of grooves are formed over the generally entire width of the light scattering guide plate 32. The groove group has a structure which is common to the groove group 102 in the first embodiment. That is, the groove group has a corrugate shape within a cross section parallel to a general running direction of the incidence surface 32A, and depth of each of the grooves (depth of corrugate shape) becomes shallower as getting away from the incidence surface 32A. A range in which the groove group is formed is limited to the same range as that of the first embodiment (e.g., the range of W2).

(iii) On the incidence surface 32A, a great number of grooves 320 are formed over the generally entire width of the light scattering guide plate 32. The groove group 320 has a corrugate shape within a cross section parallel to the emission surface 32C, and depth of the groove (depth of corrugate shape) is constant. The groove group 320 of the present embodiment has the same formation pitch as the groove group 301 in the vicinities of the upper and lower edges, and is formed so that crests correspond to one another, and valleys correspond to one another.

(iv) In the vicinities of the upper and lower edges where the emission surface 32C and both the side surface intersect, a great number of grooves are formed. For the sake of convenience of drawing, a side surface 32D of both the side surface is illustrated as a representative, and a groove group 303 of each of the groove groups is illustrated as a representative. Each of these groove groups has a corrugate shape within a cross section parallel to a general running direction of each of the side surfaces, and depth of each of the grooves (depth of corrugate shape) becomes shallower as getting away from each side surface.

Generally, it is preferable that the groove group 303 formed for the upper edge and/or the lower edge of each of the side surfaces is shallower than the groove group 301 formed for the incidence surface, and a range in which the groove group 303 is formed is made narrow.

(v) A great number of grooves 330 are formed on each of the side surface (only the side surface 32D is illustrated as a representative). The groove group 330 has a corrugate shape within a cross section parallel to the emission surface 32C, and depth of the groove (depth of corrugate shape) is constant. Generally, it is preferable that the groove group 330 formed on each of the side surfaces is shallower than the groove group 320 formed on the incidence surface 32A, and a range in which the groove group 330 is formed is limited to narrow.

The above-described items (i) and (ii) prevent the bright line from being generated by the same mechanism as that of the first embodiment. The item (iii) disperses illumination light entering from the incidence surface 32A toward both the side surfaces of the light scattering guide plate 32 to uniform the emission light. The item (iv) prevent a weak bright line which may be generated due to the illumination of the upper and lower edges of the side surface of the guide plate, by the same mechanism as that of items (i) and (ii) as well as the first embodiment. Further, with the item (v), illumination light is reflected by in an inner surface of the groove into many direction, thereby uniforming the emission light.

(4) Modifications

Figure 8:
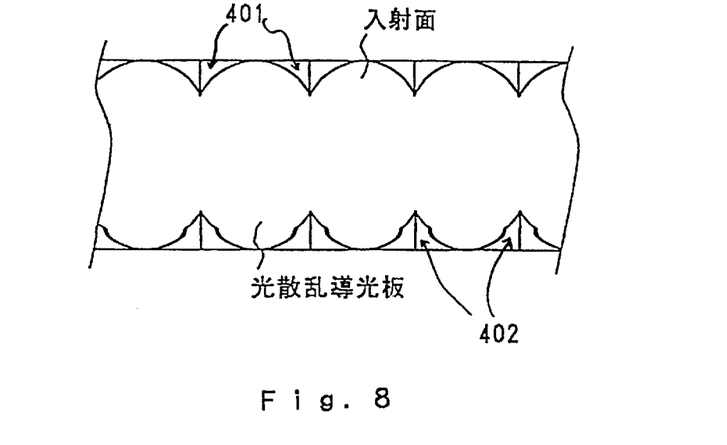
FIG. 8 is a plan view showing an incidence surface of a light scattering guide plate employed in a surface light source device according to a modified embodiment of the invention.

The above-described first to third embodiments are not for limiting the present invention. For example, the following modifications are possible:

(a) Formation pitch and corrugate shape and other factors of the grooves for preventing the reflective appearance can be variously modified. For example, as shown in FIG. 8, corrugate shape may be formed by repeating a semicircular shape element 401. Further, various corrugate shapes such as a sine corrugate shape and a triangular shape whose vertex is rounded may be employed.

(b) In each of the above-described embodiments, the triangular shape is reduced in size as getting away from the incidence surface, and the depth of corrugate shape becomes gradually shallower. However, the present invention is not limited to this. For example, the angle of the vertex of the crest may be gradually increased so that the depth of corrugate shape becomes gradually shallower. Alternatively, the depth of corrugate shape may gradually become shallower by changing the triangular shape to a curved or shell surface.

(c) In the second embodiment, the light control surface (corrugate prism surface) is formed on the entire surface of the emission surface, and corrugate shape is formed in the vicinity of the incidence surface of the back surface. However, this relation may be opposite. That is, the light control surface (corrugate prism surface) may be formed on the entire surface of the back surface, and corrugate shape may be formed in the vicinity of the incidence surface of the emission surface.

(d) In the first and third embodiments, corrugate shape whose depth is changed is formed in the vicinity of the incidence surface on each of the emission surface and the back surface. However, corrugate shape whose depth is changed may be formed on one of the emission surface and the back surface.

(e) A regular reflection member made of arbitrary material, a diffused reflection member made of white PET or the like may be employed for the reflection sheet.

(f) A typical type of the light control member (prism sheet) is formed by curing an acryl-based ultraviolet curing resin or the like on a base comprising, e.g., a transparent PET such as to form recesses and protrusions, and is fixed. However, other materials may be employed. For example, a transparent flexible material such as polycarbonate (PC), polymethyl methacrylate (PMMA) and the like may be employed. Further, a sheet-shaped or plate-shaped light control member (prism element) having no flexibility may be employed.

(g) In the above-described embodiments, the light scattering guide plate is employed as a guide plate. However, the light scattering guide plate may be changed to a transparent guide plate. Materials and manufacturing methods for the light scattering guide plate are not limited.

(h) A shape of cross section of the guide plate may not be edge-shape. For example, a guide plate having a uniformed thickness may be employed.

(i) The incidence surface of the guide plate may be set on two or more end surfaces. In accordance with this, a plurality of primary light source may be provided.

(j) The primary light source may include a light source element other than a bar-shaped light source such as a fluorescent lamp. For example, the primary light source may be formed by depositing a plurality of point light sources, such as light emitting diode and the like.

(k) The surface light source device of the present invention may be applied to a usage other than a back lighting. For example, the surface light source device of the invention can widely be applied to various lights and displays.

What is claimed is:

1. A surface light source device of side light type, comprising a guide plate having an emission surface and a back surface as major surfaces, and a primary light source for supplying illumination light through an end surface of said guide plate, in which said emission surface intersects said end surface to provide a first edge and said back surface intersects said end surface to provide a second edge, wherein said guide plate is provided with a great number of grooves running generally perpendicular to said end surface from said first edge and/or said second edge, said great number of grooves have a corrugate shape within a cross section thereof parallel to said end surface, with depth of said corrugate shape being reduced as getting away from said end surface.

2. A surface light source device of side light type according to claim 1, wherein said guide plate has a side surface adjacent to said end surface and said emission surface intersects said side surface to provide a third edge while said back surface intersects said side surface to provide a fourth edge, said guide plate further being provided with a great number of grooves running generally perpendicular to said side surface from said third edge and/or said fourth edge, said great number of grooves having a corrugate shape within a cross section thereof parallel to said side surface, with depth of said corrugate shape being reduced as getting away from said side surface.

3. A surface light source device of side light type according to claim 1, wherein a light control surface for correcting directivity of emission light from said emission surface is formed over the entire surface of one of said emission surface and said back surface, said light control surface being provided with a great number of projections running as to cross generally at right angles with said end surface.

4. A surface light source device of side light type according to claim 2, wherein a light control surface for correcting directivity of emission light from said emission surface is formed over the entire surface of one of said emission surface and said back surface, said light control surface having a great number of projections running as to cross generally at right angles with said end surface.

5. A surface light source device of side light type according to any one of claims 1, 2, 3 and 4, further comprising a light control element for correcting directivity of emission light from said guide plate along said emission surface.

* * * * *